CALCULATOR DECIMAL POINT ALIGNMENT APPARATUS

Filed June 12, 1964

2 Sheets-Sheet 1

INVENTORS
MATTHEW A. ALEXANDER
THOMAS J. SCUITTO
BY Samuel Lindenberg
Arthur Frederick
ATTORNEYS INVENTORS
MATTHEW A. ALEXANDER
THOMAS J. SCUITTO
BY Samuel Lindenberg
Arthur Freilich
ATTORNEYS United States Patent Office 3,375,356
Patented Mar. 26, 1968

3,375,356
CALCULATOR DECIMAL POINT ALIGNMENT APPARATUS

Thomas J. Scuitto, Malibu, and Matthew A. Alexander, Santa Monica, Calif., assignors to Wyle Laboratories, El Segundo, Calif., a corporation of California Filed June 12, 1964, Ser. No. 374,574
10 Claims. (Cl. 235—160)

This invention relates generally to electronic calculator apparatus and more particularly to improved means for entering numbers into such apparatus.

U.S. patent application Ser. No. 314,387 filed on Oct. 7, 1963, now Patent No. 3,330,946, issued July 11, 1967 and assigned to the same assignee as the present application discloses a calculating apparatus incorporating a small memory, e.g., of the magnetic disc type, which defines a plurality of multistage number storing registers. Means are provided for entering multidigit numbers (one digit per stage) into any of the registers. Additional means are provided for accessing any of the stored numbers, for initiating arithmetic operations thereon, and for subsequently storing the results of an operation back into a selected register. Output means including visual display means are provided for continually displaying the numbers stored in the register.

A significant feature of the calculator apparatus disclosed in the cited patent application permits a decimal point position to be defined in a corresponding stage of all of the registers. Arithmetic operations are performed in a manner which permits results to be properly stored with respect to the decimal point.

The preferred means for entering numbers into the registers in the cited patent application involves first defining an initial stage for all of the registers which stage corresponds to the position of the most significant digit in any of the numbers to be entered. The digits in each of the numbers are entered in the order of most to least significant. Inasmuch as the first digit entered into each of the registers will be stored in the defined initial stage, in the event the most significant digit in a particular number is considerably downscale from the defined initial stage, a quantity of non-significant zero digits has to be entered prior to the most significant digit being entered. Thus, the operator must carefully determine the number of non-significant zero digits to enter in order to properly position the significant digits with respect to the defined decimal point position. As a practical matter, requiring the operator to count non-significant digits in this manner raises the possibility that errors will be introduced and that the results of succeeding arithmetic operations will be meaningless.

An alternative technique which could be used to enter numbers is to redefine the initial stage for each number to be entered. This technique also is likely to introduce errors.

Accordingly, it is an object of the present invention to provide improved means for entering numbers into a calculator apparatus.

It is a more particular object of this invention to provide improved means for entering digits of a multidigit number into a register and for properly positioning the digits with respect to a defined decimal point position.

Briefly, the present invention is directed to apparatus which permits the digits of a number to be entered into a calculator register in a predetermined order without regard to positioning the digits in the proper stages of the register. Once all significant digits to the left of the defined decimal point position are entered, upon command, all of the entered digits are shifted into proper alignment with the defined decimal point position without it being necessary for the operator to define the amount of shifting required.

In accordance with the preferred embodiment of the invention, in order to enter a number into a selected register, a key associated with that register is initially actuated. Then the digit key corresponding to the most significant digit in the whole number portion of the number is actuated to enter it into the most significant stage of the selected register. Digits of decreasing significance are then entered into succeedingly less significant stages of the selected register. After all the digits to the left of the decimal point in the number have been entered, an "align" key is actuated, which causes all of the entered digits to be shifted to the right so that the least significant entered digit moves into the stage immediately to the left of the defined decimal point. Thereafter, the digits to the right of the decimal point, i.e., the fractional portion of the number, can be entered. In the event more digits are entered prior to the actuation of the "align" key than there are stages to the left of the defined decimal point position, an overflow indicator is set.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

Figure 1:
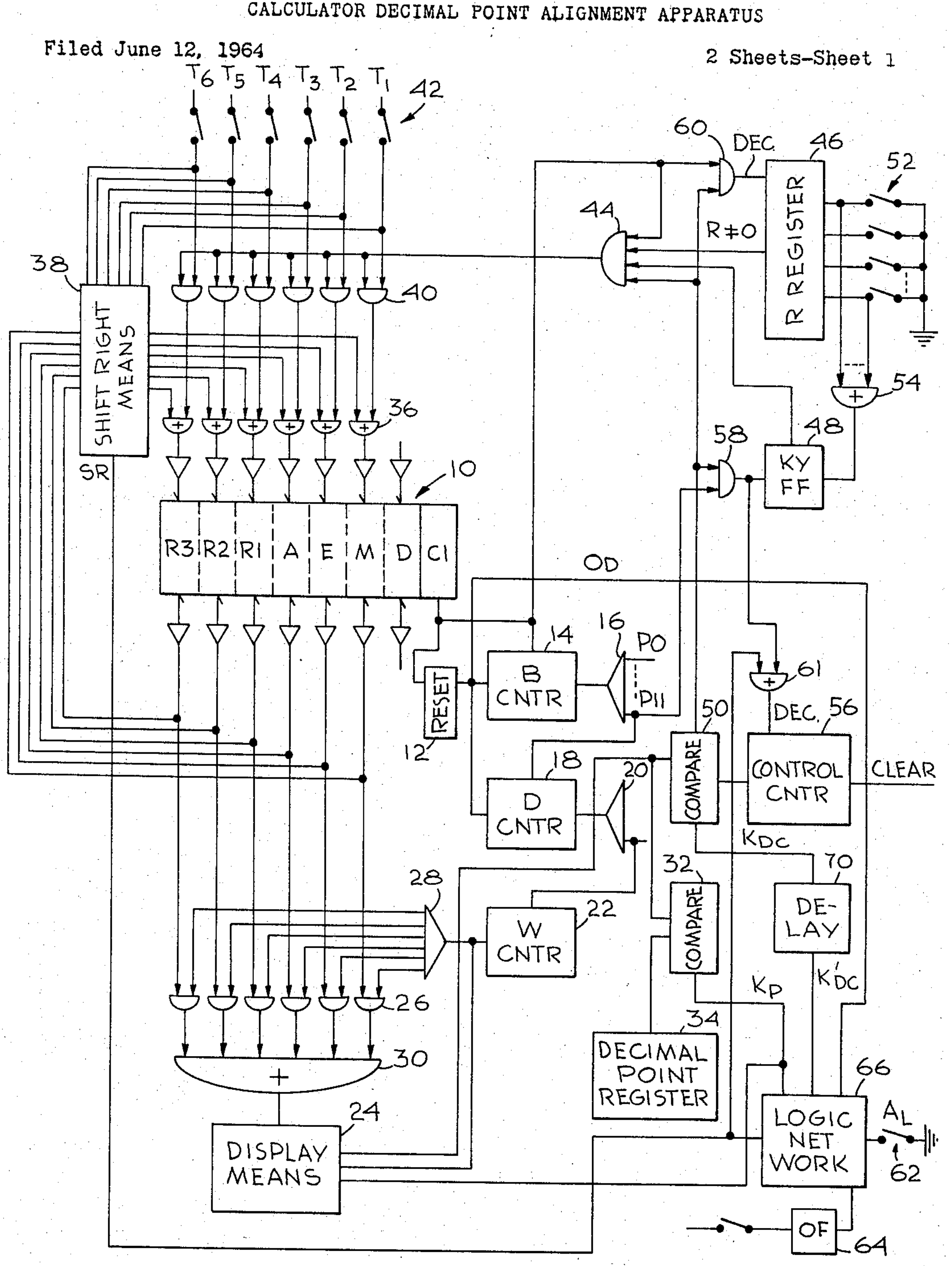
FIGURE 1 is a block diagram of a calculator apparatus incorporating means in accordance with the present invention for aligning numbers entered into the calculator apparatus with a defined decimal point.

Attention is initially called to FIGURE 1 of the drawings which illustrates a calculator apparatus incorporating means in accordance with the invention for entering numbers into the apparatus in alignment with a defined decimal point position.

As discussed in much greater detail in the aforecited patent application, the calculator apparatus includes a memory 10 which can for example, be of the movable magnetic media type, as for example disc or drum. The memory 10 can be provided with a plurality of tracks which in addition to a clock (Cl) track, can include a delay (D) track, and a plurality of register tracks respectively identified as the multiplier-quotient (M) register, the entry (E) register, the accumulator (A) register, and three reserve or scratch pad registers R1, R2, and R3. Each of the register tracks can include a plurality of digit and timing sectors followed by a gap. In turn, each of the sectors can include a plurality of bit positions, e.g., nine, and a plurality of space positions e.g., three. A magnetically recognizable mark or pulse is recorded in each of the bit and space positions of the clock track and is capable of being sensed by a head coupled to the input of a clock track output amplifier $Cl_0$ shown in FIGURE 2.

Figure 2:
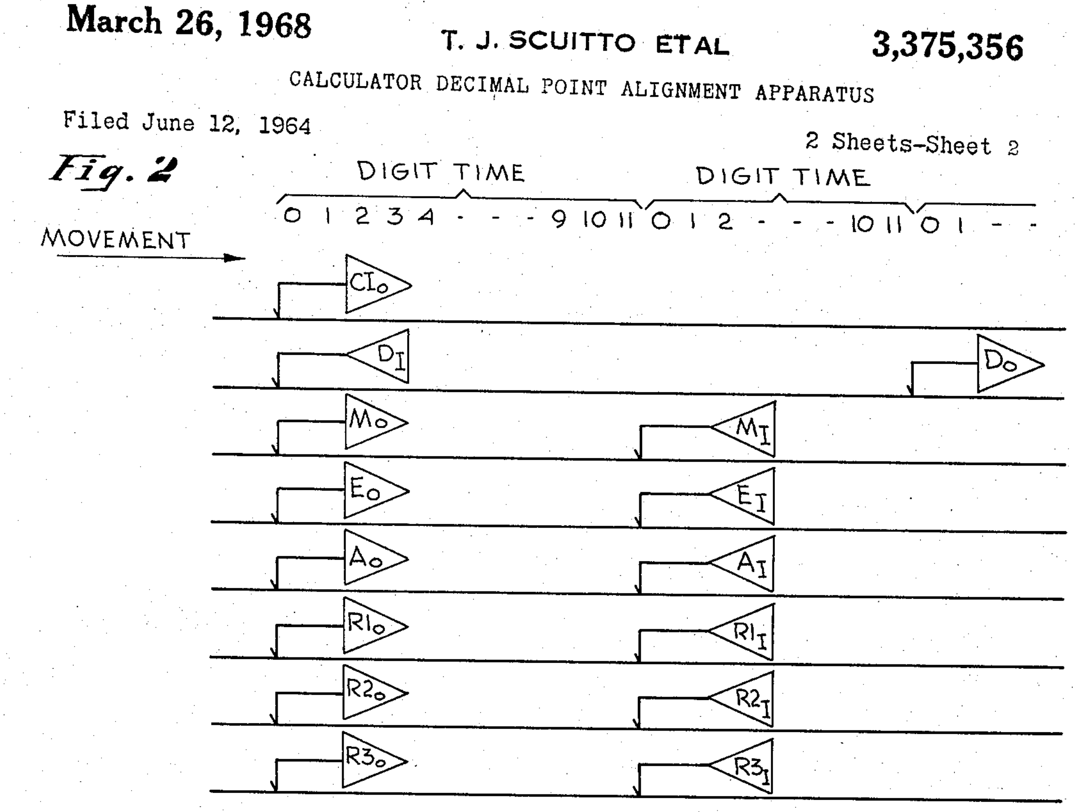
FIGURE 2 is a schematic diagram of a typical memory head orientation which can be employed in the memory of FIGURE 1.

A typical head arrangement disclosed in the aforecited patent application is illustrated in FIGURE 2 for the purpose of facilitating an understanding of the operation of memory 10 of FIGURE 1. Aligned with the ouput amplifier $Cl_0$ head are heads coupled to output amplifiers $M_0$, $E_0$, $A_0$, $R1_0$, $R2_0$, and $R3_0$ which are respectively associated with the M, E, A, R1, R2, and R3 registers. Positioned so as to follow these output amplifier heads by one digit sector (note that the direction of disc movement is from left to right and therefore a specific disc area initially passes under a head positioned to the left and subsequently passes under a head positioned to the right) are heads associated with input amplifiers $M_I$, $E_I$, $A_I$, $R1_I$, $R2_I$, and $R3_I$. Aligned with the output amplifier heads is a delay track head coupled to input amplifier $D_I$. Following the input amplifier $D_I$ head by two digit sectors is the head of an output amplifier $D_0$. The specific functions of all of the memory tracks are discussed in detail in the aforecited patent application and thus are not repeated herein.

Digit representing manifestations can be stored in the memory 10 in accordance with an incremental digital code. That is, in order to store a manifestation representing the digit "9," one pulse can be recorded in each of nine successive bit positions of a selected digit sector. In order to store the number "932" in a selected register, nine pulses can be recorded in the hundred's digit sector thereof, three pulses in the ten's digit sector thereof, and two pulses in the unit's digit sector thereof. Information can be so recorded in each of the memory tracks other than the clock track.

With continuing reference to FIGURE 1, it is to be noted that the output of amplifier $C1_0$ is connected to a reset circuit 12 which functions to sense the previously mentioned gap and in response thereto to provide a reset signal $O_D$ once for each cycle of the memory. In addition to the reset circuit 12, a bit or B counter 14 is connected to the output of amplifier $C1_0$. Coupled to the output of the B counter 14 is a decoding circuit 16 which has a plurality of output lines, a different one of which is energized in response to each of the B counter states. The B counter is capable of defining twelve different states represented by periods P0 through P11, each state corresponding to a different position in a digit sector. The decoding circuit 16 output terminal which is energized during bit period P11 is coupled to the input of D counter 18. The output of D counter 18 is connected to the input of a decoding circuit 20 one of whose plurality of output terminals is connected to the input of W counter 22.

The B and D counters are used to indicate the position of the movable memory. That is, inasmuch as the B counter is incremented in response to each mark recorded on the memory clock track and since the D counter is incremented in response to each cycle of the B counter, the counts in the B and D counters always identify the digit sector and position therein which is adjacent the heads associated with the output amplifiers and thus in a position to be read. The D counter counts in an incrementing manner which corresponds to the least to most significant order in which the sectors pass the reading heads. Thus, the lowest numbered sector is the least significant and the highest numbered is the most significant. The B and D counters are reset once each memory cycle by reset circuit 12.

The W counter is incremented in response to each cycle of the D counter and is used to successively couple each of the output amplifiers to a display means 24. Thus, each of the memory output amplifiers is connected to the input of a different one of And gates 26. The output of the W counter 22 is connected to the input of a decoding circuit 28 each of whose plurality of output terminals is connected to the input of a different one of the And gates 26. The outputs of all of the And gates 26 are connected to the input of an Or gate 30 whose output is connected to the display means 24.

The display means 24 can comprise a cathode ray tube type device capable of displaying digits read from the memory. The outputs of the D and W counters are also connected to the display means 24 for properly positioning the digits to be displayed. Thus, the number stored by each register can be displayed at a different vertical position by the display means 24, the vertical position being determined by the W counter. Each different digit in the same displayed number can be displaced laterally from the prior digits by utilizing the count in the D counter to control the horizontal deflection of the display means 24.

In addition to being able to display the digits of the numbers stored in the memory 10, the display means 24 is responsive to a coincident signal $K_p$ provided by a compare means 32 for displaying a decimal point. The compare means 32 is responsive to the output of the D counter and to the output of a decimal point register 34. Input means (not shown) selectively controllable by an operator are provided to enable the decimal point register to be selectively set to thereby permit the signal $K_p$ to be developed coincident with the reading and display of any selected sector. The decimal point will be displayed by the display means 24 to the right of the digit stored in the same sector.

Connected to each memory track input amplifier is the output of an Or gate 36. A first input terminal to each of the Or gates 36 is derived from a different output terminal of a shift right means 38. The second input to each of the Or gates 36 is derived from the output of a different And gate 40. A first input to each of the And gates 40 is connected to a different one of a bank of switches 42 which permit an operator to identify a particular memory register into which information is to be entered. The switches 42 includes switches T1, T2, T3, T4, T5, T6 which are respectively associated with registers M, E, A, R1, R2, and R3. The second input to all of the And gates 40 is derived from the output of an And gate 44. The inputs to the And gate 44 are derived from an R register 46, from the output amplifier $C1_0$, from a key flip-flop 48, and from a compare circuit 50.

The R register 46 is employed to store a digit identified by the actuation of one of a bank of digit keys 52. The bank of digit keys 52 includes ten digit keys, each capable of driving the R register to counts 0 through 9. When any one of the bank of digit keys 52 is closed, the output of an Or gate 54 drives the key flip-flop 48 to a true state. The true output terminal of the key flip-flop 48 is connected to the input of And gate 44.

The compare circuit 50 functions to compare the output of the D counter 18 with the output of a control counter 56. The compare circuit 50 will provide a coincidence signal $K_{DC}$ when the states of the counters 18 and 56 are identical. The output of the compare circuit 50 is connected to the input of And gate 44 and in addition to the inputs of And gates 58 and 60. The second input to And gate 58 is derived from the output terminal of the decoding circuit 16 which is energized during bit period P11. The output of the And gate 58 is used to reset the key flip-flop 48.

The second input to the And gate 60 is derived from the output amplifier $C1_0$ and is connected to a decrementing input terminal of the R register. Thus, during the digit time in which the counts in the counters 18 and 56 are coincident, the R register 46 will be decremented in response to each of the marks read from the clock track. The input to And gate 44 derived from the R register is true for so long as the R register defines a non-zero state. Thus, if a key in the bank of digit keys 52 is actuated to drive the R register 46 to a count of e.g., six, during the subsequent digit time in which the count in the counters 18 and 56 are coincident, the R register will be decremented to zero in response to six successive pulses derived from the memory clock track, and coincident with each of these pulses, And gate 44 will provide a signal to one of the And gates 40 selected by the closed switch 42, to thereby record a like number of pulses on the selected memory register track. During bit period P11 of the interval in which the coincidence signal $K_{DC}$ is developed, the key flip-flop 48 will be reset.

From what has been said thus far, it should be appreciated that a digit identified by the actuation of a particular one of the keys 52 will be entered into the sector identified by the count in the control counter 56 in the register associated with the closed switch 42. Although the means for recording a number of pulses in a sector to represent a digit has been disclosed, no means have been shown for erasing previously recorded pulses. Thus, e.g., where it is desired to store the digit "5" in a sector previously storing the digit "6," the extra previously recorded pulse must be erased. In order to accomplish this erasure, as discussed in greater detail in the aforecited patent application, the selected input amplifier is enabled for the entire digit time during which recording is to take place. While the amplifier is enabled, it will erase all previously recorded pulses and record new pulses only if they are applied thereto, as by gate 44. The gate (not shown) which can be used to enable the amplifier would have the same inputs as gate 44 except for the input derived from the R register.

In accordance with prior techniques for entering numbers into the memory registers, as for example described in the aforecited patent application, the control counter 56 was initially preset to define a sector corresponding to the significance of the most significant digit in any of the numbers to be entered into the memory. After each digit was entered, the control counter 56 was decremented by the output of And gate 58 applied to the control counter 56 through Or gate 61. By decrementing the control counter 56, the next digit entered into the R register would be transferred to the sector of immediately lower significance in the selected memory register. As noted in the introduction to the present specification, such a technique for entering numbers into the memory 10 raised a likelihood that errors would be introduced inasmuch as it required the operator to count non-significant zeros to be entered where the most significant digit in one of the numbers to be entered was downscale from the most significant digit of all of the numbers.

In accordance with the present invention, the control counter 56 is initially always set to a count representing the most significant digit sector in the registers, instead of the digit sector corresponding to the most significant digit of the numbers to be entered. Thus, in response to the development of a clear signal which is developed by means (not shown) at the conclusion of all of the calculator operations, the control counter 56 will be driven to a count equal to the most significant digit sector. The initial digit entered in the selected register will therefore be entered into the most significant digit sector and the control counter 56 will be decremented. The digit represented by the subsequent actuation of a digit key 52 will then be entered into the next most significant digit sector and similarly, succeedingly identified digits will be entered into sectors of decreasing significance. After all of the digits in the number to the left of the decimal point are entered into the appropriate register, actuation of the align key 62 will shift all of the entered digits to the right to place the least significant of the entered digits immediately to the left of the decimal point position defined by the decimal point register 34. On the other hand, if the least significant entered digit had by chance been entered immediately to the left of the defined decimal point position, the align operation initiated in response to the closure of the key 62 will be immediately terminated. In the event that more digits are entered than digit sectors exist to the left of the defined decimal point position, an overflow flip-flop indicator 64 will be set to indicate this fact to the operator. The logic network 66 is responsive to the closure of the align key 62 and to the defined decimal point position and the digits entered for determining whether the entered digits should be shifted right, the overflow flip-flop indicator set, or the align operation immediately terminated. The details of a preferred embodiment of the logic network 66 are disclosed in FIGURE 3.

Prior to considering the logic network illustrated in FIGURE 3, attention is called to Table I hereinafter set forth for the purpose of demonstrating how the display means would appear to an operator in the situation where the entered digits are shifted right in response to the actuation of the align key 62. Table I illustrates a portion of the display including only three of the registers and for the sake of simplicity in the table, each of the three registers has been assumed to contain only 15 digit sectors. It is assumed that a number is to be entered in register 2. Arbitrarily chosen numbers stored in registers 1 and 3 are also illustrated.

TABLE I

| | | 15 | 14 | 13 | 12 | 11 | 10 | 9 | 8 | 7 | 6 | 5 | 4 | 3 | 2 | 1 |
|---|---|---|---|---|---|---|---|---|---|---|---|---|---|---|---|---|
| Portion 1 | (1) | 0 | 7 | 0 | 6 | 3 | 2 | 8 | 1. | 0 | 0 | 1 | 4 | 0 | 0 | 0 |
| | (2) | 0 | 0 | 0 | 0 | 0 | 0 | 0 | 0. | 0 | 0 | 0 | 0 | 0 | 0 | 0 |
| | (3) | 0 | 0 | 0 | 0 | 1 | 2 | 1 | 0. | 1 | 6 | 0 | 0 | 0 | 0 | 0 |
| Portion 2 | (1) | 0 | 7 | 0 | 6 | 3 | 2 | 8 | 1. | 0 | 0 | 1 | 4 | 0 | 0 | 0 |
| | (2) | 3 | 0 | 0 | 0 | 0 | 0 | 0 | 0. | 0 | 0 | 0 | 0 | 0 | 0 | 0 |
| | (3) | 0 | 0 | 0 | 0 | 1 | 2 | 1 | 0. | 1 | 6 | 0 | 0 | 0 | 0 | 0 |
| Portion 3 | (1) | 0 | 7 | 0 | 6 | 3 | 2 | 8 | 1. | 0 | 0 | 1 | 4 | 0 | 0 | 0 |
| | (2) | 3 | 2 | 0 | 0 | 0 | 0 | 0 | 0. | 0 | 0 | 0 | 0 | 0 | 0 | 0 |
| | (3) | 0 | 0 | 0 | 0 | 1 | 2 | 1 | 0. | 1 | 6 | 0 | 0 | 0 | 0 | 0 |
| Portion 4 | (1) | 0 | 7 | 0 | 6 | 3 | 2 | 8 | 1. | 0 | 0 | 1 | 4 | 0 | 0 | 0 |
| | (2) | 3 | 2 | 1 | 0 | 0 | 0 | 0 | 0. | 0 | 0 | 0 | 0 | 0 | 0 | 0 |
| | (3) | 0 | 0 | 0 | 0 | 1 | 2 | 1 | 0. | 1 | 6 | 0 | 0 | 0 | 0 | 0 |
| Portion 5 (Push align key) | (1) | 0 | 7 | 0 | 6 | 3 | 2 | 8 | 1. | 0 | 0 | 1 | 4 | 0 | 0 | 0 |
| | (2) | 0 | 0 | 0 | 0 | 0 | 3 | 2 | 1. | 0 | 0 | 0 | 0 | 0 | 0 | 0 |
| | (3) | 0 | 0 | 0 | 0 | 1 | 2 | 1 | 0. | 1 | 6 | 0 | 0 | 0 | 0 | 0 |
| Portion 6 | (1) | 0 | 7 | 0 | 6 | 3 | 2 | 8 | 1. | 0 | 0 | 1 | 4 | 0 | 0 | 0 |
| | (2) | 0 | 0 | 0 | 0 | 0 | 3 | 2 | 1. | 4 | 0 | 0 | 0 | 0 | 0 | 0 |
| | (3) | 0 | 0 | 0 | 0 | 1 | 2 | 1 | 0. | 1 | 6 | 0 | 0 | 0 | 0 | 0 |

It can be noted that portion 1 of the table contains all 0's in register 2. Assume that the decimal point is positioned in sector 8 and it is desired to enter the number 321.4 into register 2. If the control counter 56 had been set to a count of 14 to accommodate the most significant digit in the number stored in register 1, then the operator would be required to enter four non-significant zero digits prior to successively actuating the keys 52 corresponding to the digits "3," "2," and "1" in the whole number portion of the number. Inasmuch as the operator is likely to introduce errors when he is required to count the number of non-significant zero digits to be entered prior to the most significant digit in a number, in accordance with the invention herein, the control counter 56 is always initially set to the most significant digit sector (herein, 15) so that actuation of the digit key 52 corresponding to the digit "3" causes the digit to be entered into the sector 15 of register 2 as illustrated in portion 2 of Table I. Inasmuch as the control counter is decremented subsequent to entering the most significant digit in the number being entered, the succeeding digit, i.e. "2," is entered into the digit sector of immediately less significance (i.e., sector 14). Similarly, the digit "1" is entered into the digit sector (sector 13) of immediately lesser significance. After the significant digits to the left of the decimal point in the number being entered have been entered into the selected register, actuation of the align key 62 (prior to portion 5 of Table I) shifts the entered digits to the right so that the least significant digit ("1") in whole number portion is aligned immediately to the left of the defined decimal point. Subsequently, digits to the right of the decimal point in the fractional portion of the number being entered can be entered by actuation of the appropriate keys 52.

Figure 3:
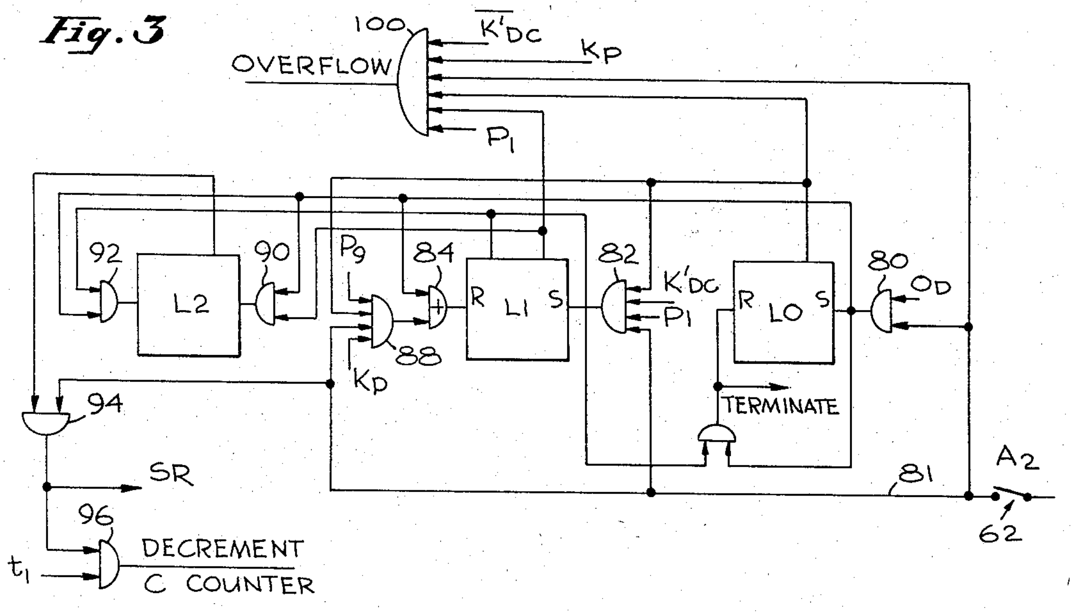
FIGURE 3 is a logical block diagram of the logic network illustrated in FIGURE 1.

If the number being entered had eight significant digits to the left of the decimal point instead of the three significant digits as illustrated in FIGURE 3, then actuation of the align key 62 would not cause any shifting. If on the other hand, more digits were entered than there were sectors to the left of the decimal point, the overflow flip-flop indicator 64 would be set.

Attention is now called to FIGURE 3 which illustrates the details of the logic network 66 of FIGURE 1. The logic network 66 is responsive to the signal $K_p$ representing coincidence between the decimal point register 34 and the D counter 18 and the signal $K'_{DC}$ representing the coincidence signal $K_{DC}$ delayed by one digit period by delay circuit 70. In addition, the logic network 66 is responsive to the signal $O_D$ provided once each memory cycle by the reset circuit 12 and of course to the signal $A_L$ developed by the closure of the align key 62. The logic network 66 operates only in response to the closure of align key 62. Essentially, it functions to cause a shift right operation in the selected register when, in any memory cycle, the signal $K'_{DC}$ is developed subsequent to the signal $K_p$. When the signal $K'_{DC}$ is developed subsequent to the signal $K_p$, it of course means that the least significant digit entered into the selected register is to the left of the defined decimal point position by at least one sector. When the signal $K'_{DC}$ is not developed subsequent to the signal $K_p$, the operation is terminated.

Logic network 66 includes three logic flip-flops respectively identified as L0, L1, and L2. The output of AND gate 80 is connected to the set input terminal of logic flip-flop L0. A first input to AND gate 80 is connected to the align line 81 which is made true in response to the align key 62 being closed. The second input to AND gate 80 is made true in response to the provision of the signal $O_D$ by the reset circuit 12.

Connected to the set input terminal of logic flip-flop L1 is the output of AND gate 82. The true output terminal of the logic flip-flop L0 and the align line 81 are connected to the input of AND gate 82. In addition, the output of the delay circuit 70 providing signal $K'_{DC}$ is connected to the input of AND gate 82 along with the output terminal of decoding circuit 16 energized during bit period P1. Thus, logic flip-flop L1 will be set during the align operation whenever logic flip-flop L0 is set and during bit period P1 of the digit time immediately subsequent to the digit time in which the counters 18 and 56 coincided. Inasmuch as the state of the control counter 56 defines the sector of immediately lesser significance than the sector into which the least significant digit was entered, it can effectively be compared in time with the development of the signal $K_p$ to determine whether a right shift operation is required. By permitting the signal $K_p$ to reset the logic flip-flop L1, the state of the logic flip-flop L1 at the end of a memory cycle indicates whether the right shift operation is necessary. More particularly, connected to the reset input terminal of logic flip-flop L1 is the output of Or gate 84 whose inputs are connected respectively to the outputs of AND gates 80 and 88. The output of gate 80 of course assures that the logic flip-flop L1 is reset at the beginning of each memory cycle during the align operation. The inputs to AND gate 88 are derived from the align line 81, the true output terminal of logic flip-flop L0, the comparison circuit 32 providing coincidence siganl $K_p$, and the output line of decoding circuit 16 energized during bit period P9. Thus, And gate 88 functions to reset the logic flip-flop L1 during the digit time corresponding to the position of the decimal point. From a consideration of the inputs to gates 82 and 88, it should be appreciated that at the end of a memory cycle, the logic flip-flop L1 will be in a set state only if the least significant digit entered is stored in a sector one or more sectors to the left of the sector containing the decimal point.

The state of the logic flip-flop L1 is transferred to the logic flip-flop L2 through And gates 90 and 92 at the end of a memory cycle. During the succeeding memory cycle, if logic flip-flop L2 is true, And gate 94 will provide a true output signal which will be applied to the shift right means 38 of FIGURE 1 to shift the contents of the selected register one sector to the right. In addition, the control counter 56 will be decremented by the output signal provided by gate 96 during the interval corresponding to one of the previously mentioned timing sectors. The control counter 56 will be decremented until it defines the digit portion immediately to the right of the decimal point. During the subsequent memory cycle, the logic flip-flops L1 and L2 will operate similarly to again determine whether a shift right operation is required. The entire align operation is terminated when the logic flip-flop L1 is in a false state at the end of a memory cycle. This condition is detected by And gate 98 whose inputs are connected to the false output terminal of logic flip-flop L1 and to the output of And gate 80. The output of And gate 98 develops a terminate signal which in addition is applied to reset the logic flip-flop L0.

It should be appreciated that if the signals $K_p$ and $K'_{DC}$ both occurred during the same digit time of a memory cycle, meaning that the least significant entered digit was stored immediately to the left of the decimal point, then the logic flip-flop L1 would have been in a reset state at the end of that memory cycle inasmuch as the And gate 88 is operative during bit period P9 while the And gate 82 is operative earlier during bit period P1. Thus, in the situation where the least significant digit entered is initially entered immediately to the left of the decimal point, no shift right operation is initiated and the terminate signal is developed within the first complete memory cycle after the align key 62 is actuated.

In the situation where more digits are entered prior to the actuation of key 62 than there are sectors to the left of the defined decimal point position, a signal must be developed to set the overflow flip-flop 64. This signal is derived from the output of And gate 100. And gate 100 provides a true output signal in the event the signal $K_p$ is developed during period P1 when the logic flip-flop L1 is in a set state (as a result of the previous development of signal $K'_{DC}$) and the signal $K'_{DC}$ is not being developed simultaneously therewith. Other inputs to the And gate 100 are derived from the align line 81 and the true output terminal of the logic flip-flop L0. The latter input of course prevents the And gate 100 from being operative during an initial partial cycle of the memory after the align key 62 is closed.

Figure 4:
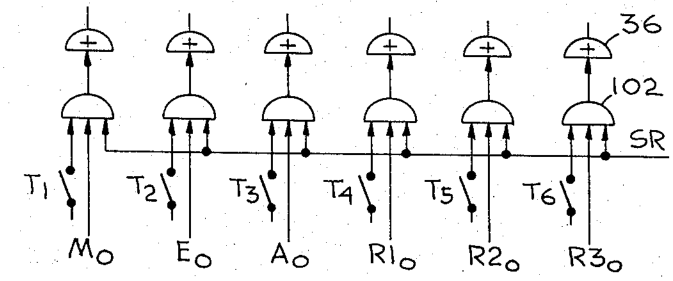
FIGURE 4 is a logical block diagram of apparatus which can be utilized as the "shift right means" of FIGURE 1.

The shift right means 38, as noted, is responsive to the shift right signal developed by And gate 94 of FIGURE 3 to shift the number initially entered into the selected register right by one digit sector. The details of the means for shifting the contents of a register right one digit sector are fully disclosed in the aforecited patent application and are generally illustrated in FIGURE 4. It will be recalled from FIGURE 2 herein that the head associated with each register output amplifier, e.g., $A_0$, leads the head associated with the corresponding input amplifier, i.e., $A_I$, by one digit sector. Thus, information can be shifted right so that the information appears one digit time earlier by merely transferring read information directly from the output amplifier to the input amplifier. This is accomplished by the apparatus of FIGURE 4 herein which includes a different And gate 102 coupling each output amplifier to the input of the Or gate 36 connected to the corresponding input amplifier. The shift right signal provided by And gate 94 of FIGURE 3 is connected to the input of each gate 102. A third input to each of the And gates 102 is derived from a different one of the switches 42.

From the foregoing, it should be appreciated that means have been provided herein which can be incorporated into a calculator apparatus for automatically aligning digits entered into the apparatus in response to the actuation of a single key. Thus the operator is not required to count and enter any non-significant zero digits as has been characteristic of previously applicable techniques. The means introduced herein operates essentially by temporarily storing the entered digits in the most significant digit sectors in the selected register and by subsequently shifting the entered digits into alignment with the defined decimal point position where appropriate.

What is claimed is:

1. In a calculator apparatus including a memory comprised of at least one register which includes a plurality of stages and a decimal point identifying means identifying one of said stages, the improvement comprising:

means for successively generating manifestations respectively representing different digits of the whole portion of a multidigit number to be stored in said one register and for temporarily storing said manifestations in arbitrarily chosen ones of said plurality of stages;

means for initiating an align operation; and means responsive to said align operation being initiated for shifting all of said manifestations stored in said arbitrarily chosen stages until the manifestation representing the least significant digit in said whole portion of said number to be stored is stored in said stage identified by said decimal point identifying means.

2. Apparatus comprising:

at least one register including first and second end stages and a plurality of intermediate stages, each stage capable of storing a digit representing manifestation;

means for sequentially developing in the order of significance manifestations each representing a different digit of the whole portion of a multidigit number;

means for temporarily storing the initially developed manifestation in said first end stage and for storing each succeedingly developed manifestation in succeeding register stages;

means defining a particular one of said register stages; and means for comparing said particular one of said register stages with the stage storing the last developed manifestation.

3. Apparatus comprising:

at least one register including first and second end stages and a plurality of intermediate stages, each stage capable of storing a digit representing manifestation;

means for sequentially developing in the order of significance manifestations each representing a different digit of the whole portion of a multidigit number;

means for temporarily storing the initially developed manifestation in said first end stage and for storing each succeedingly developed manifestation in succeeding register stages;

means defining a particular one of said register stages;

means for comparing said particular one of said register stages with the stage storing the last developed manifestation; and means responsive to said means for comparing for successively shifting each of said stored manifestations to an immediately succeeding stage until the last developed manifestation is stored in said particular one of said register stages.

4. A calculator apparatus comprising:

at least one register including a most significant stage and a plurality of decreasingly significant stages, each stage capable of storing a digit representing manifestation;

means for developing manifestations each representing a different digit of the whole portion of a multidigit number in the order of most to least significant;

means for temporarily storing the manifestation representing the most significant digit in said most significant stage of said register and for storing subsequently developed digits in order in said decreasingly significant stages of said register;

means defining a decimal point in a selected one of said register stages; and means for comparing said selected one of said register stages with the stage storing the manifestation representing the least significant digit.

5. A calculator apparatus comprising:

at least one register including a most significant stage in a plurality of decreasingly significant stages, each stage capable of storing a digit representing manifestation;

means for developing manifestations each representing a different digit of the whole portion of a multidigit number in the order of most to least significant;

means for temporarily storing the manifestation representing the most significant digit in said most significant stage of said register and for storing subsequently developed digits in order in said decreasingly significant stages of said register;

means defining a decimal point in a selected one of said register stages;

means for comparing said selected one of said register stages with the stage storing the manifestation representing the least significant digit; and means responsive to said means for comparing for successively shifting each of said stored manifestations to immediately less significant stage until the manifestation representing the least significant digit is stored in said selected one of said register stages.

6. A calculator apparatus comprising:

at least one register including a most significant stage in a plurality of decreasingly significant stages, each stage capable of storing a digit representing manifestation;

means for developing manifestations each representing a different digit of the whole portion of a multidigit number in the order of most to least significant;

means for temporarily storing the manifestation representing the most significant digit in said most significant stage of said register and for storing subsequently developed digits in order in said decreasingly significant stages of said register;

means defining a decimal point in a selected one of said register stages;

means for comparing said selected one of said register stages with the stage storing the manifestation representing the least significant digit;

an overflow indicator; and means responsive to said means for comparing for setting said overflow indicator in the event said manifestation representing said least significant digit is stored in a less significant stage than said selected one of said stages.

7. The calculator apparatus of claim 4 including means for continually displaying the digits represented by the manifestations stored in said register stages.

8. A calculator apparatus comprising:

cyclic memory means including at least one register having a most significant and a plurality of decreasingly significant digit storing stages and a first counter for successively defining each of said stages;

a control counter;

a first comparison circuit for providing a first coincident signal when said first counter and said control counter define identical counts;

means for developing in order of significance digit representing manifestations each representing a different digit of the whole portion of a multidigit number;

means for storing each succeedingly developed digit representing manifestation in the register stage defined by said first counter coincident with the provision of a different one of said first coincident signals;

means responsive to the storage of each of said digit representing manifestations for decrementing said control counter;

means for initially setting said control counter to define said most significant stage;

means defining a decimal point stage;

means for selectively initiating an align operation; and means responsive to the initiation of said align operation for shifting each of said stored manifestations to succeedingly less significant stages until the last developed manifestation is stored in said decimal point stage.

9. A calculator apparatus comprising:

cyclic memory means including at least one register having a most significant and a plurality of decreasingly significant digit storing stages and a first counter for successively defining each of said stages;

a control counter;

a first comparison circuit for providing a first coincident signal when said first counter and said control counter define identical counts;

means for developing in order of significance digit representing manifestations each representing a different digit of a multidigit number;

means for storing each succeedingly developed digit representing manifestations in the register stage defined by said first counter coincident with the provision of a different one of said first coincident signals;

means responsive to the storage of each of said digit representing manifestations for decrementing said control counter;

means for initially setting said control counter to define said most significant stage;

a decimal point register;

a second comparison circuit for providing a second coincident signal when said first counter in said decimal point register defines identical counts;

means for selectively initiating an align operation;

means responsive to the initiation of said align operation for shifting each of said stored manifestations to a less significant stage and for coincidently decrementing said control counter; and means responsive to the counts defined by said control counter and said decimal point register having a predetermined relationship for terminating said shifting and decrementing.

10. The calculator apparatus of claim 8 including means for continually displaying digits represented by said manifestations stored in said register stages.

References Cited

UNITED STATES PATENTS

| | | | |
|---|---|---|---|
| 2,769,592 | 11/1956 | Burkhart et al. | 235—159 |
| 3,103,580 | 9/1963 | Foreman | 235—159 |
| 3,160,857 | 12/1964 | Frush | 235—159 X |
| 3,193,669 | 7/1965 | Voltin | 235—160 X |
| 3,234,368 | 2/1966 | Kregness | 235—159 |

MALCOLM A. MORRISON, *Primary Exmainer.*

M. P. HARTMAN, *Assistant Examiner.*